Oct. 7, 1924.
H. R. McCONNELL
CHUCK
Filed March 2, 1923
1,510,896
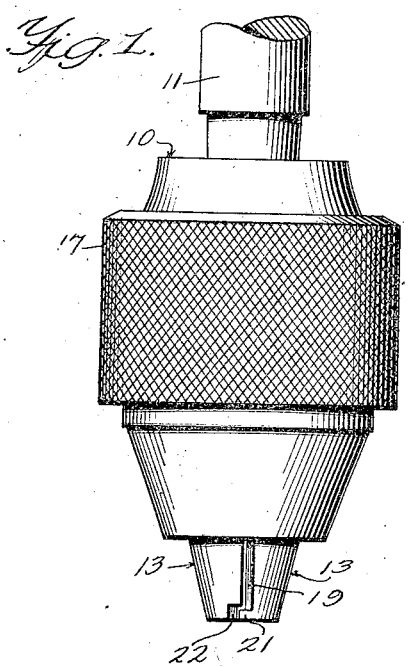
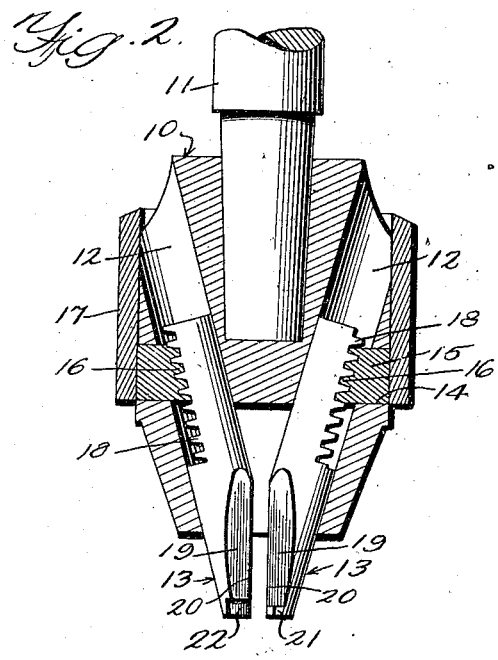
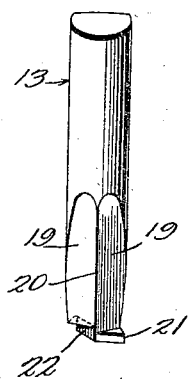
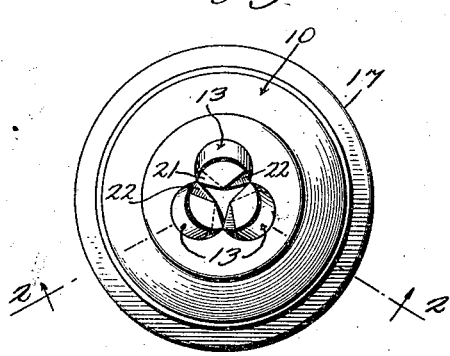
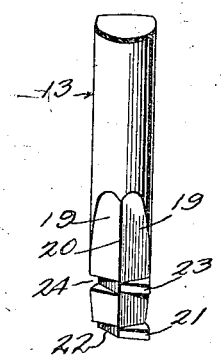
Inventor
H. R. McConnell,
By
Attorney Patented Oct. 7, 1924.

1,510,896

UNITED STATES PATENT OFFICE.

HARRY R. McCONNELL, OF RICHMOND, VIRGINIA, ASSIGNOR TO THE McCONNELL-BROWNING ENGINEERING COMPANY, OF RICHMOND, VIRGINIA, A CORPORATION OF VIRGINIA.

CHUCK.

Application filed March 2, 1923. Serial No. 622,346.

*To all whom it may concern:*

Be it known that I, HARRY R. McCONNELL, a citizen of the United States, residing at Richmond, in the county of Henrico and State of Virginia, have invented certain new and useful Improvements in Chucks, of which the following is a specification.

This invention relates to chucks and more particularly to such a device wherein the gripping jaws employed are constructed so as to prevent inaccurate placing of the tool shank within the jaws.

In a type of chuck now commonly employed there is provided a body portion adapted to be mounted upon a driving spindle and provided with a plurality of downwardly converging circularly arranged openings in which the gripping jaws are slidably mounted. The gripping jaws usually employed are provided upon their lower portions with inner flat faces arranged at an angle to each other and terminating in gripping edges arranged substantially parallel to the axis of the spindle and the body portion of the chuck. The gripping edges of the jaws are spaced to provide for the reception of the shank of a drill or other tool and the jaws themselves are spaced from each other a distance substantially equal to the tool receiving space between the jaws. The upper and outer portions of the jaws are threaded for engagement with internal threads of a rotatable ring which is connected with an outer rotatable sleeve surrounding the body portion of the chuck. Rotation of the sleeve, through the threaded engagement mentioned, moves the jaws inwardly and downwardly with respect to each other to permit the insertion of the shank of the tool. It frequently happens that the shank of the tool, instead of being properly centered within the gripping edges of the jaws, becomes arranged with a portion extending into the space between the jaws so that the tool is clamped at an angle to the axis of the body portion.

An important object of the present invention is to provide a chuck employing jaws of a peculiar construction whereby displacement of the shank of the tool from its proper position is prevented.

Other objects and advantages of the invention will be apparent during the course of the following description.

In the drawings, I have shown several embodiments of the invention. In this showing, Figure 1 is a side elevation of a chuck embodying the invention, Figure 2 is a central longitudinal sectional view through the chuck substantially on line 2—2 of Figure 3, Figure 3 is an end elevation of the chuck, Figure 4 is a detail perspective view of one of the jaw members, and, Figure 5 is a similar view of a slightly modified form of jaw member.

Referring to the drawings, the numeral 10 designates the body portion of a chuck mounted upon the spindle 11 of a drill press or other machine. The body portion 10 is provided with a plurality of circularly arranged downwardly converging openings 12 in which are slidably arranged jaw members designated as a whole by the reference numeral 13.

The body portion 10 is provided intermediate its ends with a circumferential groove 14 in which is rotatably mounted a ring 15 internally threaded as at 16 for a purpose to be described. A sleeve 17 surrounds a portion of the body portion and has a driving fit with the ring 15 but is rotatable about the body portion 10. It will be apparent that rotation of the sleeve 17 will rotate the ring 15.

The upper portions of the jaw members 13 are threaded upon their outer portions as at 18 and these threads engage the internal threads 16 of the ring 15. As stated the members 13 are slidable within the openings 12 of the body portion and it will be apparent therefore that rotation of the sleeve 17 will move the jaw members 13 upwardly and outwardly or downwardly and inwardly according to the direction of rotation of the sleeve. The lower and inner portions of the jaws are provided with angular faces 19 terminating in gripping edges 20 which are arranged substantially parallel to the axis of the body portion as clearly shown in Figure 2. Referring to Figure 4 of the drawings it will be seen that each jaw member is provided adjacent its lower end with a projection 21 extending outwardly from one of the faces 19 while upon its opposite side each jaw member is provided with a cut out portion or recess 22 which is preferably slightly wider than the projection 21. Referring to Figure 3, it will be seen that each projection 21 is arranged adjacent the recess 22 of the adjacent jaw member so that when the jaw members are moved downwardly and inwardly for engagement with a relatively small tool shank, the projections 21 are adapted to be received within the adjacent recesses 22. With the construction described it will be seen that the spaces between the jaw members decrease outwardly, presenting an angular space whereby the shank of the tool is prevented from becoming lodged in these spaces.

In Figure 5 of the drawings I have shown a slightly modified form of jaw member. In this form, each jaw member is provided with faces 19 and projection 21 and recess 22 as previously described. A second projection 23 extends outwardly from one of the faces 19 at a point spaced above the projection 21. The other face 19 is provided with a recess 24 arranged at a point spaced above the recess 22 and opposite the projection 23. When this form of jaw member is employed it will be apparent that the projections 21 and 23 are adapted for reception within the recesses 22 and 24 respectively when the jaw members are moved to their inner positions.

The operation of the device is as follows:
When it is desired to insert the shank of a tool within the jaw members, the ring 17 is rotated in the proper direction to withdraw the jaws a sufficient distance to permit insertion of the tool shank. The shank is inserted between the jaw members and the sleeve 17 is rotated in the reverse direction until the edges 20 engage with the shank of the tool whereupon a wrench or similar tool may be applied to the sleeve 17 to tightly grip the edges 20 against the tool. As previously stated, with the jaw constructions commonly employed a space is presented between each pair of jaws which is substantially equal to the space adapted to receive the shank of the tool. The shank of the tool frequently becomes lodged within one of these spaces placing the tool out of alinement with the axis of the chuck. With the present construction, referring to Figure 3 of the drawings, it will be seen that the spaces between the pairs of jaw members are relatively small and are angular, as shown. If the shank of the tool tends to become lodged between the pairs of jaws, inward movement of the jaws tends to dislodge the shank and force it to its proper position due to the angularity of the spaces between the jaws. The operator therefore is permitted to properly place the shank of the tool without undue caution when the sleeve 17 is rotated to move the jaws downwardly and inwardly.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. A chuck comprising a body portion, a plurality of circularly arranged jaw members carried thereby and adapted to be moved toward and away from each other, means for actuating said members, said jaw members being normally spaced from each other and being provided substantially centrally of their inner faces with gripping edges adapted to grip a tool centrally therebetween, each of said jaw members being provided with a portion projecting toward an adjacent jaw member whereby the spaces between said jaw members decrease in width outwardly from the tool, said projecting portions being out of engagement with the tool when the latter is gripped between said gripping edges.

2. A chuck comprising a body portion, a plurality of circularly arranged jaw members carried thereby and adapted to be moved toward and away from each other, means for actuating said members, said jaw members being normally spaced from each other and being provided substantially centrally of their inner faces with gripping edges adapted to grip a tool centrally therebetween, each of said jaw members being provided with a portion projecting toward an adjacent jaw member whereby the spaces between said jaw members decrease in width outwardly from the tool, each of said jaw members being further provided with a recess adapted to receive the projecting portion of an adjacent jaw member, said projecting portions being out of engagement with the tool when the latter is gripped between said gripping edges.

3. A chuck comprising a body portion, a plurality of circularly arranged jaw members carried thereby and adapted to be moved toward and away from each other, and means for actuating said members, each of said jaw members being provided with angularly arranged faces merging into a gripping edge, said edges being adapted to receive a tool therebetween, the adjacent faces of said jaw members being parallel, each of said jaw members being provided with a projection extending from one face thereof whereby the spaces between said jaw members decrease in width outwardly from the center of the tool, said projections at their inner ends merging into said gripping edges.

In testimony whereof I affix my signature in presence of two witnesses.

HARRY R. McCONNELL.

Witnesses:
Miss M. AGATHA TYNDALL,
CHAS. W. CLARK.